A. W. HERBERT.
FASTENING DEVICE FOR RIBBED EXPANDED METAL PRODUCTS.
APPLICATION FILED AUG. 26, 1913.
1,095,396.
Patented May 5, 1914.
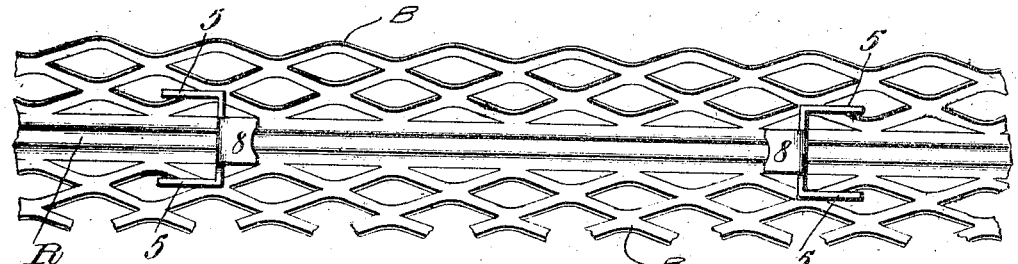
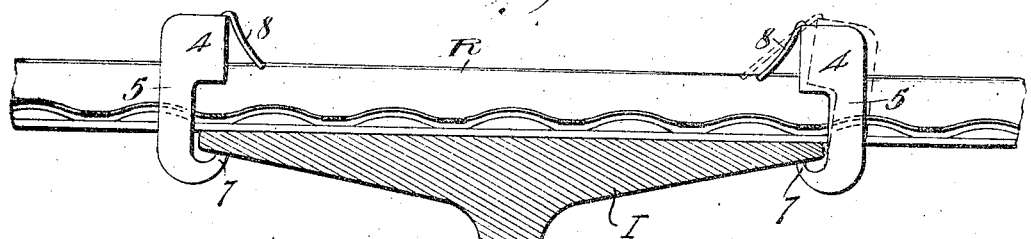
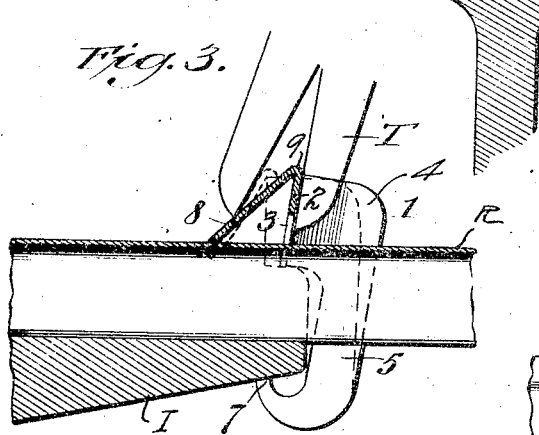
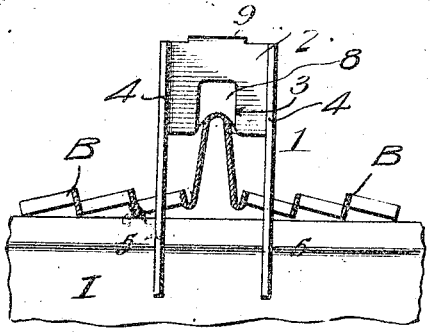
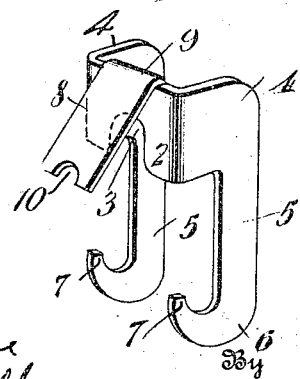
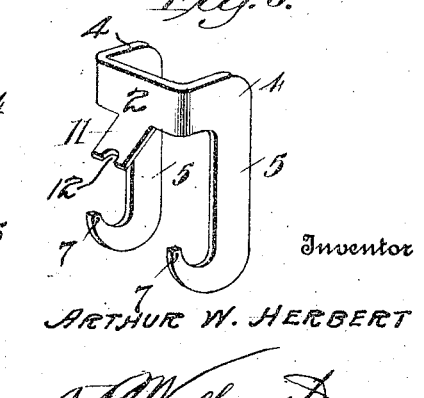
Inventor
ARTHUR W. HERBERT

UNITED STATES PATENT OFFICE.

ARTHUR W. HERBERT, OF YOUNGSTOWN, OHIO, ASSIGNOR TO THE GENERAL FIRE-PROOFING COMPANY, OF YOUNGSTOWN, OHIO, A CORPORATION OF OHIO.

FASTENING DEVICE FOR RIBBED EXPANDED-METAL PRODUCTS.

1,095,396. Specification of Letters Patent. Patented May 5, 1914.

Application filed August 26, 1913. Serial No. 786,750.

*To all whom it may concern:*

Be it known that I, ARTHUR W. HERBERT, a citizen of the United States, residing at Youngstown, in the county of Mahoning and State of Ohio, have invented certain new and useful Improvements in Fastening Devices for Ribbed Expanded-Metal Products, of which the following is a specification.

This invention relates to novel fastening means for expeditiously and securely fastening expanded sheet metal, such as metal lathing, to I-beams or other supports, and possesses special utility in its application as a fastener for expanded sheet metal which acts as self-centering when secured to beams or other permanent supports in fireproof building structures.

To this end, the object of the invention is to provide a simple and practical fastening device of the character indicated which may be readily and economically manufactured from a sheet metal blank by stamping process, while at the same time providing a fastener which may be easily and quickly applied and securely locked in place by a simple operation of applying pressure thereto by a pair of pliers or equivalent tool.

Other objects and advantages of the present device will readily appear to those skilled in the art, as the description of the same proceeds, and the nature thereof is better understood in connection with the accompanying drawings wherein a preferred and practical form of the invention is disclosed.

Figure 1 is a plan view of a section of a ribbed expanded metal sheet resting upon a beam, and showing the application of the invention. Fig. 2 is a cross sectional view of the structure shown in Fig. 1. Fig. 3 is a detail elevational view showing how the device forming the subject matter of this invention is locked in place. Fig. 4 is an elevational view showing the device locked in place. Fig. 5 is a perspective view of the invention. Fig. 6 is a perspective view of a modification.

Similar reference characters designate corresponding parts throughout the several figures of the drawings:

The invention is specially adapted for use in connection with expanded sheet metal products such as metal lathing which have upstanding longitudinal ribs formed integral therewith, and for the purposes of illustration a structure of this type is shown in the accompanying drawings wherein the reference letter B designates the body of the material, and the letter R designates a rib thereof.

As distinguished from the expedients ordinarily employed for fastening metal self-centering, or metal lathing to I-beams or other supports, the present invention provides a clip-like element for this purpose and the same operates to securely clamp the metal sheets to the I-beams or other support in such a manner as to prevent displacement or movement thereof in any direction while the concrete or other plastic material is being applied thereto.

The improved clip preferably consists of a single stamping made from sheet metal, the same being pressed up to assume the general form shown in the drawings, and designated in its entirety by the reference character 1. The device includes a body-web 2, which is provided with a centering and rib-clearance notch 3, and with the parallel wings 4 extending to one side of the body-web 2, and having the substantially angularly disposed leg members 5. The unconnected terminals of the legs 5 are formed with the curving holding hooks 6 having terminal projecting engaging feet 7 adapted to engage under and against a flange of an I-beam I. The body-web 2 has also integrally formed therewith as at 9 an integral locking tongue 8 which is bent to the side of the body-web 2 opposite the wings 4. This tongue 8 has in its free end portion a rib engaging notch 10 which is adapted to engage the rounded crown of one of the metal ribs R.

The modification disclosed in Fig. 6 is similar to the form of the invention shown in Fig. 5 except in the particular of not being provided in its body-web 2 with the centering and clearance notch 3, but instead thereof having its locking tongue 11 displaced directly from the material between the two legs 5 of the clip, thus economizing the material.

Referring to the method of applying one of the clips it will be observed from the drawings that the same is placed astride a rib R so that the centering and clearance notch 3 engages the crown portion of the same, and the hooks 6 of the legs 5 engage the underside of the flange of the I-beam, as clearly shown in Figs. 2 and 3. The locking tongue 8 also bears on the rib, and while in this position (as shown in Fig. 3) a pair of pliers, or other tool T, is applied to the body-web 2 and to one side of the locking tongue 8, so that upon exerting pressure thereon the said tongue is crowded and bent onto the rib into substantially the position shown by dotted lines, and tilting the entire clip into a tight holding position. In this connection it will be observed that in forcibly pressing or bending the locking tongue 8 toward the body of the clip, a toggle action occurs which not only draws the rigid hooks 7 into tight engagement with the beam or support I, but also pinches the end of the tongue 8 into the crown of the rib R, thereby most securely locking together the clip, the ribbed expanded metal material, and the supporting beam I. It will also be observed that the engagement of the tongue 8 is preferably crosswise the crown of the rib.

In applying the modification of the invention shown in Fig. 6, the rib engaging notch 12 in the end of the locking tongue 11 takes the place of the centering and clearance notch 3 in the main form of the invention, and aids in locating the clip on the rib so that both of the engaging feet 7 will be in contact with the flange of the I-beam.

In connection with the centering notch 3 and the notches 10 and 12 on the locking tongues 8 and 11 respectively, it may be said that the latter as well as the former greatly facilitate the application of these clips to the ribs of the expanded metal sheets, inasmuch as they tend to center the entire clip and keep both engaging hooks in contact with the flange of the I-beam. And, by properly centering the clip, the force exerted by the locking tongues 8 and 11 is evenly distributed throughout the entire clip so that all engaging points are rendered the maximum efficiency.

From the foregoing it is believed that the many advantages and features of the invention will be entirely clear without further description and it will be understood that minor changes in the form, proportion, and details of construction may be resorted to without departing from the scope of the appended claims, or sacrificing any advantages of the invention.

I claim:

1. A device for fastening ribbed expanded sheet metal to a support, the same comprising a body insertible through openings in the expanded metal and having at one end a rigid holding hook engaging with said support, and at its other end provided with an inturned locking tongue disposed in opposing relation to the hook and adapted to be placed under compression on and against the crown of a rib of the expanded metal.

2. A device for fastening ribbed expanded sheet metal to a support, the same comprising a body web having inturned hook members at one end for engagement with the support, and an inturned bendable locking tongue disposed at one side of the body web at the other end of the latter and arranged in opposition to said hook members for engagement across and on the crown of a rib of the metal.

3. A device for fastening ribbed expanded sheet metal to a support, the same comprising a body web having rigid inturned hook members arranged at one end of the web and projected to one side thereof, and a bendable locking tongue formed at the opposite end of the body web and projecting from the same side thereof as the hook members, said locking tongue being adapted to be moved under compression on the crown of a rib of the expanded metal to produce a toggle locking action.

4. A device for fastening ribbed expanded sheet metal to a support, the same comprising a body web provided with a centering and rib clearance notch and having rigid hook members projected to one side thereof, and a bendable locking tongue projecting to one side of the body web at the end of the latter opposite the hook members, said locking tongue being arranged to engage crosswise of the crown of a rib and provided with a notch at its end.

In testimony whereof I hereunto affix my signature in the presence of two witnesses.

ARTHUR W. HERBERT.

Witnesses:
E. G. KELTY,
H. R. GLENN.